United States Patent [19]

Virtanen

[11] Patent Number: 4,999,959
[45] Date of Patent: Mar. 19, 1991

[54] PRESTRESSED CONSTRUCTION ELEMENT OF COMPOSITE STRUCTURE AND METHOD FOR ELEMENT FABRICATION

[75] Inventor: Pentti Virtanen, Toijala, Finland
[73] Assignee: Kautar Oy, Toijala, Finland
[21] Appl. No.: 435,365
[22] PCT Filed: Apr. 26, 1988
[86] PCT No.: PCT/FI88/00062
§ 371 Date: Nov. 3, 1989
§ 102(e) Date: Nov. 3, 1989
[87] PCT Pub. No.: WO88/08907
PCT Pub. Date: Nov. 17, 1988

[30] Foreign Application Priority Data

May 5, 1987 [FI] Finland .................. 871976
Nov. 6, 1987 [FI] Finland .................. 874899

[51] Int. Cl.$^5$ ............................................. E04C 3/26
[52] U.S. Cl. ........................ 52/230; 52/223 R; 264/228; 264/229
[58] Field of Search .......... 52/223 R, 230; 264/229, 264/228

[56] References Cited

U.S. PATENT DOCUMENTS 2,413,990  1/1947  Muntz ........................ 52/223 R
2,645,115  7/1953  Abeles .
2,677,957  5/1984  Upson ........................ 52/230
4,726,163  2/1988  Jacobs ...................... 52/230 X

FOREIGN PATENT DOCUMENTS 60360    11/1942  Denmark .
809961    8/1951  Fed. Rep. of Germany .
908786    4/1954  Fed. Rep. of Germany .
1659252   1/1971  Fed. Rep. of Germany .
65081     7/1942  Norway .

Primary Examiner—Michael Safavi
Attorney, Agent, or Firm—Birch, Stewart, Kolasch & Birch

[57] ABSTRACT

The invention concerns a prestressed construction element of composite structure comprising a bar- or tendon-like inner part (1) of high tensile strength, a sheat part (2) of, e.g., high-strength concrete or ceramic material, adapted about and precompressed by the inner part (1), and a shape-forming structure (4) adapted about the sheath part (2) with dimensions corresponding to the desired dimensions of the construction element. According to the invention, the structure (4) is such an elastic material as is capable of taking both compression and tensile stresses without cracking. The construction in accordance with the invention achieves a strong and easily workable construction element.

4 Claims, 2 Drawing Sheets

PRESTRESSED CONSTRUCTION ELEMENT OF COMPOSITE STRUCTURE AND METHOD FOR ELEMENT FABRICATION

BACKGROUND OF THE INVENTION

The present invention relates to a prestressed construction element of composite structure.

The invention also concerns a method for the fabrication of the prestressed element.

Being entailed with the use of materials of different elastic properties as well as of differing values of Young's modulus and yield characteristics, building technology has been forced to rely on special constructions. In use of these constructions, part of the materials are imparted to such conditions within the core of the element that under load not even the weakest element of the construction is imposed to bending or deformations leading to cracking. In other words, the aim is towards a construction of homogeneous behavior. Together with certain strength and economical prerequisites, these requirements lead to an ever increasing use of prestressed structures. These structural elements are comprised of steel structures embedded in concrete. Prior art prestressed constructions are slab or massive beam constructions fabricated by, e.g., slipform-casting concrete around pretensioned steel wires or cables. Prestressing is implemented by tensioning the wires or cables between two anchoring points. The distance between the anchoring points is typically 50 ... 100 m. After a sufficient hardening of the concrete, the elements are cut to desired length. As disclosed in FI publication print 54638 and DE publication print 2 035 385, also known are non-prestressed support structures of beam-like form, which are castable into concrete.

A disadvantage of prior art technology is that concrete structures are continuously deformed under stress up to a certain limit. In the art this behavior is called creep. Creep is described to be primarily dependent on two different factors: diffusion of excess water in a fresh, hardened concrete and its removal from the structure, and plastic deformation of the amorphous component of concrete. The magnitude of creep depends on the amount of cement used and its degree of hydration, mixing water volume used in concrete fabrication, as well as the quantity, quality and shape of stone aggregate, the quantity of entrapped air and the distribution of pores in the concrete mix, that is, factors which are difficult to determine beforehand in a systematic and exact manner. By contrast, creep is also related to the magnitude of prestressing as well as the span of the construction and other loads imposed on the structure. Whilst prestressed structures are aimed to achieve a predetermined magnitude of curvature or desired straightness, the magnitude of prestressing, creep, and other factors lead to an uncertainty in reaching a desired final state of conditions. For instance, presently such constructions as, e.g., hollow-core slabs require the use of floor levelling compounds whose thickness in the worst places, which are associated with the bending of the slabs caused by prestressing, may be even up to 2 ... 5 cm, while in the thinnest places, only a few millimeters. Levelling of hard concrete at the building site, together with all indirect costs such as material, worktime, idle time, heating, interest on bound capital, and other costs, leads to excess costs which according to very conservative estimates exceed 50% of the initial fabrication costs of the slab. In addition, present prestressed constructions of hollow-core slabs are extremely critical as to their fire resistance characteristics. In the state of the art technology, pretensioned cables can be designed into a limited number of places, and their thickness choices are also limited. Due to the fabrication method, all pretensioning tendons in a hollow-core slab are parallel and, consequently, so far no prestressed transversal reinforcements have been used.

Further, non-prestressed support structures lack the advantages of prestressed structures, and prior art constructions have been primarily developed to ease installation and transport of operations for small building constructors.

SUMMARY OF THE INVENTION

The aim of the present invention is to overcome the disadvantages associated with the prior art technology and obtain a totally new kind of prestressed element of composite structure, and a method for fabricating said element.

The invention is based on using three entirely different types of materials in a unitary slab construction, mutually configured in such a manner as to form the prestressed supporting structure from an essentially bar-shaped inner part of high tensile strength, which has been strained or caused to stretch in its longitudinal direction, and a sheath part cast around the tensioned core from high-strength concrete or ceramic material, thus achieving a compressing stress to the sheath part. Around the prestressed supporting structure is cast an elastic shape-forming structure capable of taking tensile stress, whose material has a Young's modulus being advantageously 0.15 ... 0.30-fold that of the tough material of the sheath part of the element.

In an advantageous embodiment of the invention, the tough sheath acting as a part of the reinforcement structure is allowed to creep into its final shape in a storage until the sheath is used as a part of the slab construction in accordance with the invention.

More specifically, the prestressed construction element of composite structure in accordance with the invention includes a shape forming structure which is fully described later in the specification.

Further, the method in accordance with the invention includes joining and coating steps which are also fully described later in the specification.

The invention provides outstanding benefits.

By differentiating the functions of the structural parts of a construction element, the structural compromise customarily made in the combination of strength, weight, deformations, and other like parameters, can be avoided. In prior technology, a clear view regarding the utilization of different degrees of freedom was lacking, and in the case of their availability, how to avail of them.

Use of shape forming material around a prestressed structure has in tests performed by us astonishingly presented an appreciably improved fire resistance in the entire construction, which can be attributed to the easy escape of emerging gases from the porous structure when the expanded foam plastic filler material of the shape-forming structure melts and creates heat insulating and water vapor-permeable cavities in the material. Since the bubbles or cavities are not completely closed and compounds are released, e.g., from the lightweight filling material, this kind of concrete becomes extremely heat-resistant since the internal vapor pressures do not splinter the structure as occurs in a normal solid concrete. Consequently, this kind of a construction element fabricated from a low-density concrete is capable of protecting the cables and the compacted concrete surrounding them against high temperatures appreciably longer than a slab construction having its bottom simply fabricated from compacted concrete which embeds a prestressed cable. Equally, the method in accordance with the invention allows casting and filling the other parts of the slab while maintaining them completely straight by using the cable and the sheath only after they are prerelaxed/precreeped, presagged or prebent and prefabricated. Then, grinding or milling required for finalizing the element involves removal of extremely small quantities of material in comparison with, e.g., the final treatment required by a bent hollow-core slab of conventional technology at the construction site.

Elongation caused by load is appreciably reduCed in comparison with a conventional construction designed with a comparable steel reinforcement. This is explained thereby that during a load, the prestressed reinforcement structure in accordance with the invention achieves a smaller elongation $\Delta/l(=F*l/E*A)$ in accordance with Hooke's Law, since the product of Young's modulus multiplied by the area ($E*A$) in the denominator of the formula is appreciably increased. The product term is decreased at low additional cost because the proportion of pretensioned steel in the area A can be maintained low with help of the sheath part produced from present concrete grades of extra-high strength. When the prefabricated, prestressed, and prerelaxed structural element in accordance with the invention is embedded during the on-site construction phase or in the fabrication of the concrete element into the structure, essentially less deformations of detrimental character are encountered in comparison with earlier solutions. The final release of the cast element from the molds can be carried out at an appreciably earlier stage of strength development compared with a conventional pretensioned product since the only precondition for mold release is to achieve such an element strength which can take the own weight of the element as well as its handling. Equally, this kind of a construction provides full freedom to design the aforementioned reinforcing cables in different locations and directions so that, during the drilling, notching, or other processing of the slabs, pretensioning tendons located within the structure are not subjected to severing and cutting as in the conventional methods, e.g., hollow-core slab technology. When the conventional concrete slab with pretensioned or non-prestressed steel reinforcement is compared with this novel structural element reinforced with prefabricated, pretensioned cables, the conventional slab is characterized by a construction of homogeneously cast concrete. The quality, strength, compaction and other factors of this concrete have to be selected on the basis of the most critical parameter. As an example, we can assume that the most critical factor is the corrosion protection of steel reinforcement. The technology in accordance with the invention requires, however, only the sheath of the cable to be manufactured under the constrictions set by the critical parameters. The other part of the structural element may be selected to be almost any type of material within certain limitations. With respect to these limitations in the choice of strength and density, a designer can avail himself of a much wider selection of different concrete densities, strengths, fillers, and other possibilities in the use of prestressed reinforcing structures in accordance with the invention compared with the prior art technology. The use of prefabricated, prestressed, and prerelaxed cable facilitates weight reduction in the surrounding shape-forming structure material as far as purposeful. Furthermore, the strength of surrounding material can also be reduced and fillers modified in such a manner as to facilitate grinding, levelling, and fabrication of dimensionally precisioned components in accordance with the new method, by contrast, not economically feasible in conjunction with the conventional concrete construction reinforced with hard stone material. In addition, slab length can be increased by virtue of reduced sagging. The shape-forming structure of the slab manufactured from a relatively lightweight concrete with high heat insulation capability, which structure embraces the prestressed reinforcing structures, leads to a superior heat insulation and fire resistance in comparison with the conventional technology; thereby achieving benefits which have been difficult to attain in slab constructions of prior technology. With the use of a prestressed reinforcement structure in accordance with the invention, production of prestressed elements can be speeded and the mold release limit of attained strength can be neglected as a production limiting factor.

BRIEF DESCRIPTION OF THE DRAWINGS

In the following, the invention is examined in detail with help of the following embodiments illustrated in the attached figures.

DETAILED DESCRIPTION OF PREFERRED EMBODIMENTS

According to the invention, the construction is on the one hand based on a prestressed and prefabricated reinforcement structure and on the other hand, to an embracing shape-forming part, whose material has a Young's modulus being 0.3 . . . 0.15-fold that of the tough material used in the prestressed structure. The final matrix strength of the shape-forming structure results in a strength of about 2.5 . . . 3.5-fold the tested compression strength of the structure. This behavior has been achieved by:

(a) using expanded foam plastic or rubber or the like filler material of equivalent category to replace part of the stone aggregate material used in conventional concrete and/or (b) with help of conventional methods, additionally producing into the structure gas bubble-like pores, which are smaller than pores created by the aforementioned filler material of low density.

By designing the construction for the use of a material fulfilling the minimum requirements of strength expressed above, an advantageous construction with characteristics described below can be formed:

(1) A pretensioned rod, which can be of metal, plastic polymer or amorphous or crystalline inorganic material.

(2) A sheath structure of tough concrete or ceramic material tightly embracing the bar and capable of receiving in its entirety all prestressing forces while being in a prestressed condition and having an advantageous compression strength between 70 ... 250 kPa and a Young's modulus between 10 000 .. . 42 000 kPa.

(3) A weaker material imparting the final shape to the slab by embracing the sheath structure and being capable of taking compression and tensile stresses without cracking and having a Young's modulus 0.15 ... 0.30-fold that of the sheath structure material. As described in item 2, this material does not contain coarse stone aggregate; instead, the maximum dimension of stone aggregate, if used, has a diameter which is essentially equal to the dimensional tolerance of processing for this structure of the element construction.

The aforementioned low value of Young's modulus in the construction is a prerequisite for the material to be able to take a sufficient amount of tensile stress without cracking at and after the point at which the prestress in the external sheath part of the prestressed cable has already been relieved conditions.

A composition with low strength and Young's modulus for an advantageous grade is obtained, e.g., by the following formula:

density 1500 kg/m$^3$, compressive strength K 20 (MPa)

Rapid cement: 360 kg

Sand 0 ... 3 mm: 1000 kg

Microsilica: 40 kg

Lignosulfonate: 6 kg

Polystyrene (expanded): 9 kg (hydrophilic surface treatment)

Water: 126 kg

Production formula for a high-strength concrete is exemplified as follows:

Rapid cement: 400 kg/m$^3$

Sand: 2000 kg/m$^3$ strength 100 ... 150 MPa

Silica: 40 kg/m$^3$

Lignosulfonate: 8 kg/m$^3$

Water: 140 kg/m$^3$

Figure 1:
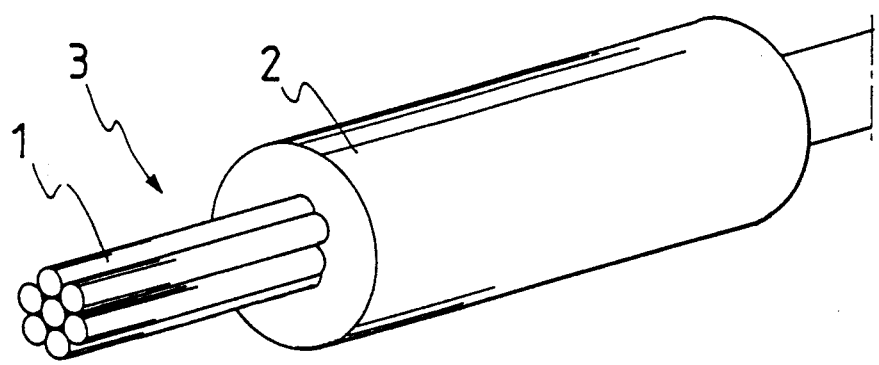
FIG. 1 shows a partly cross-sectioned perspective view of a prestressed reinforcement structure of a construction element in accordance with the invention.

According to FIG. 1, a reinforcing structure 3 in accordance with the invention comprises two parts: an inner part 1, which is a pretensioned steel wire, strand or bar and a sheath part 2 of concrete or ceramic material and circular cross-section, which embraces the inner part in a coaxial manner. The outer diameter of the reinforcing structure 3 is typically 50 mm and the inner part 1 has a diameter of 15 mm, respectively. When using extra-high strength concrete, the ratio of the inner part 1 diameter to the external diameter may be $\frac{1}{3}$.

Figure 2:
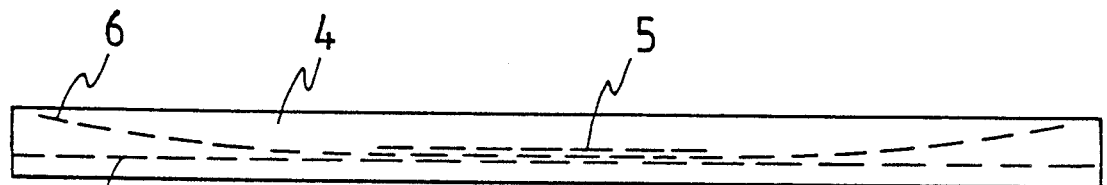
FIG. 2 shows a side view of a construction element in accordance with the invention utilizing the longitudinal reinforcement structure illustrated in FIG. 1.

According to FIG. 2, there are prestressed reinforcing structures 5 of relatively short length placed and cast into a shape-forming structure 4 into the center of the construction element. Straight prestressed reinforcing structures 7 are adapted close to the bottom of the element, while prebent reinformcing structures 6 are adapted between the short reinforcing structures 5 and the straight reinforcing structures. The dimensioning value of strength $K_n$ for the material of the shape-forming structure 4 typically varies in the range of 10 ... 50 MN/m$^2$.

Figure 3:
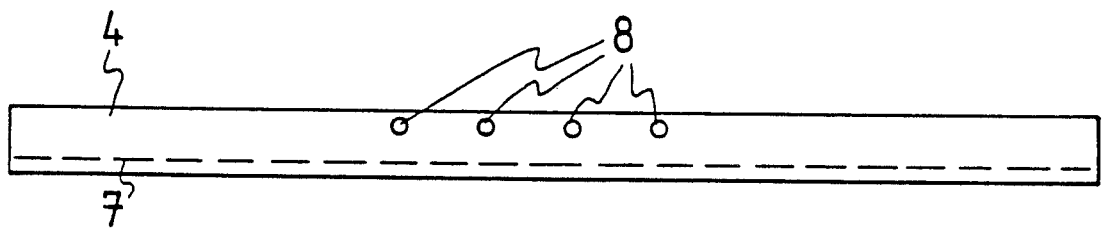
FIG. 3 shows a side view of another construction element embodiment in accordance with the invention utilizing both longitudinal and transversal reinforcement structures.
Figure 4:
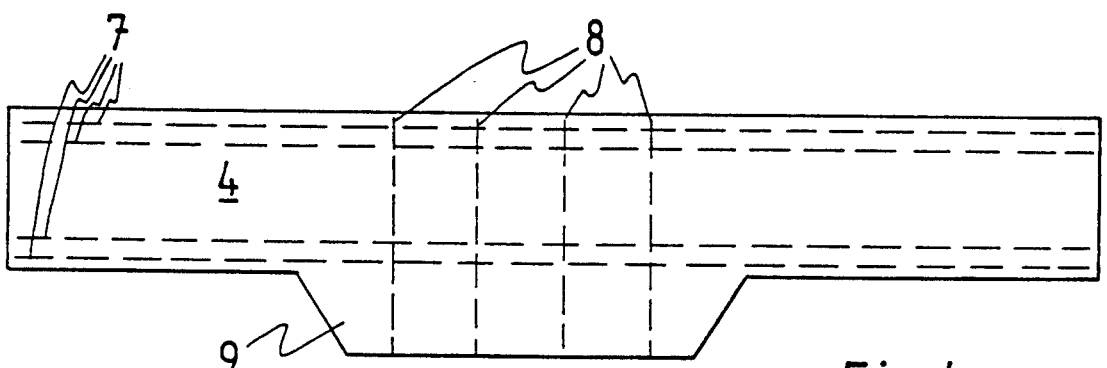
FIG. 4 shows a top of the construction element illustrated in FIG. 3.

According to the FIGS. 3 and 4, a construction element with a bracket 9 is reinforced, in addition to the prestressed reinforcing structures 7 which are longitudinally placed and cast close to the bottom surface of the element inside the shape-forming structure 4, by transversal prestressed reinforcing structures 8 which provide reinforcement for the bracket 9.

Figure 5:
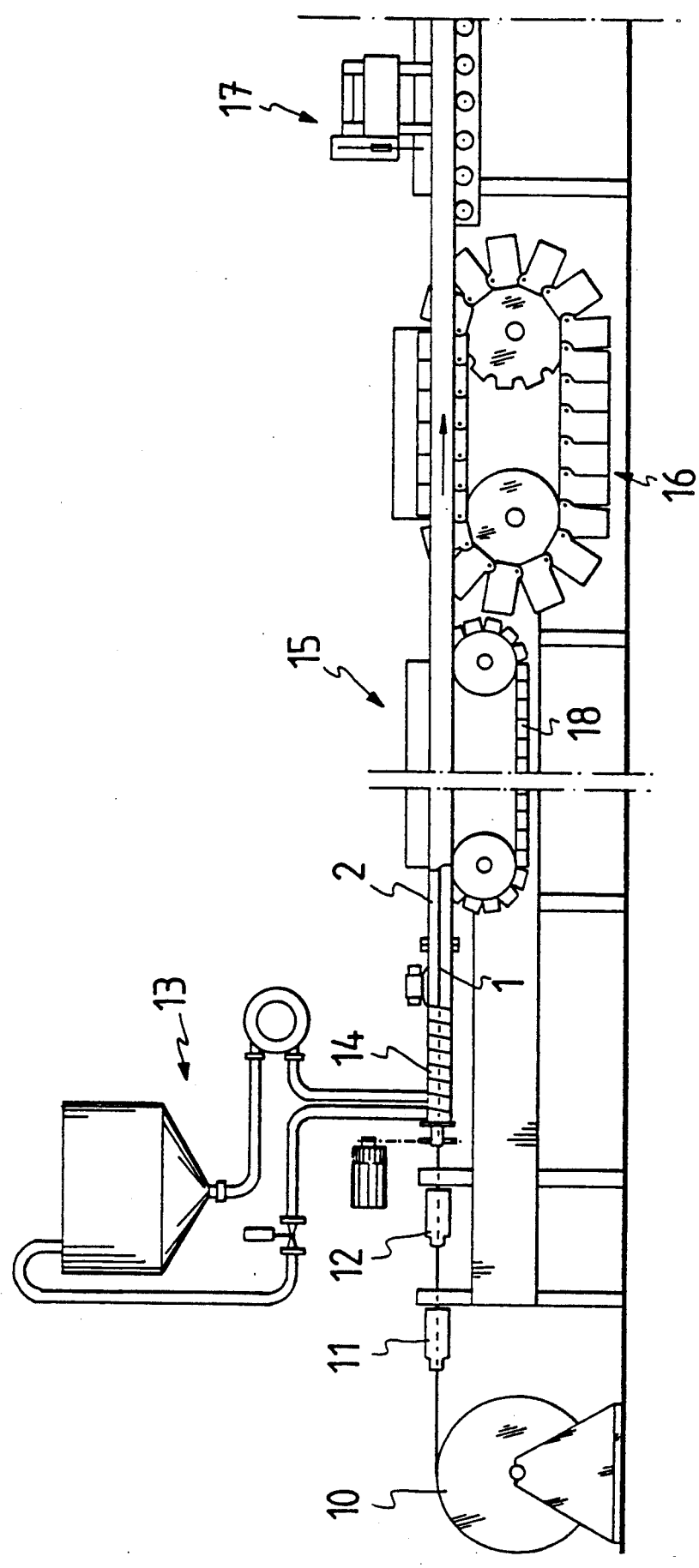
FIG. 5 shows a side view of an apparatus for fabrication of the prestressed reinforcement structure.

FIG. 5 illustrates the fabrication method of a prestressed reinforcing element as follow: a reinforcing steel tendon 1 is stretched between supports 11, 12 and 16, and a sheath structure 2 is cast of concrete or ceramic mix about the steel tendon 1. The steel tendon 1 is paid out from a reel 10 through supports 11 and 12 to a casting bed, onto which concrete mix enters under pressurized propulsion by an auger 14 from a mixing unit 13. The concrete mix is extruded about the steel tendon 1. The mix is a rapidly hardening material, such as F-concrete described in U.S. Pat. No. 4,306,912 or gelled concrete described in FI patent application 871164. The design value of strength $K_n$ of these mixes may reach up to 200 MN/m$^2$ during the installation phase. The reinforcing element assembly is moved forward by the propulsion pressure and a conveyer 18 on a curing line 15, whose length is typically about 60 m. The Curing line 15 may be provided with heating units. On the curing line 15, the mix achieves such a strength that a tensioning apparatus 16 is capable of exerting via the surface of the reinforcing element assembly 3 onto the steel tendon 1 a desired pretensioning stress, without however, producing a slip of the steel tendon 1 in respect to the sheath part 2. After the tensioning apparatus 16, the prestressed reinforcing element 3 is cut by a cutting apparatus 17 to a desired length. The castable material can be extra high-strength and/or extremely compacted concrete. Furthermore, concrete with separately mixed corrosion inhibit can be used as well as special concrete grades intended for fire protection of reinforcement steels by virtue of the fact that the quantity of sheath material is essentially small in respect to the other material volume of the slab. The fabricated structure is stored over a sufficient time to allow a sufficiently complete creep of the sheath structure. Only after this phase of storage is the cable used for reinforcement of concrete constructions or as a part of reinforcement.

FIGS. 3 and 4 illustrate a possible method of extending the reinforcing elements outside the slab construction proper or an on-site cast construction in order to form brackets, which can act as supports for mounting balconies, bay windows, and other constructions. The prestressed reinforcing structures need not necessarily be parallel within the slab construction but may be configured fan-shaped, crossed, or perpendicularly transversal, thus forming nets and any other types of constructions which are impossible to achieve in conjunction with, e.g., hollow core slabs. In places intended to bear extra-high loads, the aforementioned reinforcing structures can be designed extremely advantageously in a large number into the interior of the slab, even as dense as a close packing allows.

On a reduced-weight concrete slab with a prestressed reinforcing structure in accordance with the invention, the sag at an apartment load was about 2 mm. For a corresponding gas-expanded concrete slab with a lightly pretensioned steel reinforcement, the sag at the same load was typically 19 mm.

The embodiment of the prestressed reinforcing structure 3 illustrated in FIG. 1 can also be implemented by selecting the cross-section of the reinforcing structures 3 to be, e.g., ellipse- or rectangle-shaped. The pretensioned inner part 1 may also be located eccentrically to obtain curved constructions.

When cables are used for reinforcing such slab constructions in which gas or air bubbles, polystyrene beads, or other lightweight construction material components with high heat insulation capability are used, the cables can be connected to a low-power electrical current during slab casting, thereby achieving a strain in the cable. Later, when the temperatures are equalized and heating ceased, the constriction of the cable compensates gravity-induced sags of the slab, which means that the slab will achieve a completely levelled structure at its final installation site under normal load. This kind of a slab, which comprises of foamed or gas-expanded concrete and combinations of these together with reduced weight concrete using polystyrene beads and other non-hard filler material, incorporates a facility of having its surfaces grindable or millable with low cost tools into its final levelled shape. This kind of a construction provides a benefit of avoiding the use of large quantities of intermediate levelling compounds or surfacing materials for final working of floor surfaces, roof finishes and other final finishes as is customary with the conventional technology.

The prestressed reinforcing structures 3 may even be elsewhere prefabricated, prestressed, precreeped as well as appropriately presagged or prebent for the construction. Also all significant and relevant deformations for the final sagging may be effected or allowed to take place prior to casting.

It has been found extremely advantageous to allow the reinforcing structures 3 to sag or to prebend them downward. This is based on the experience that a prestressed, prerelaxed, prefabricated and prebent inner part of a straight construction achieves especially advantageous straight construction of final shape.

Furthermore, slabs in accordance with the invention can be connected into contiguous fields by joints attached to the cables or by armoring cables crossing transversally over these fields in order to obtain a continuously networked field within which all metal cables are prestressed and whose sheath structures covering the cables are precreeped and, when required, advantageously prebent at the instant of the final casting stage.

What is claimed is:

1. A prestressed construction element with composite construction comprising
    a pretensioned bar- or cable-like inner part (1) of high tensile strength, the material of which is metal, polymer, or amorphous or crystalline inorganic material,
    a sheath part (2) of high compressive strength material, e.g., high-strength concrete or ceramic material and arranged about and prestressed by the inner part (1), whereby the sheath part (2) advantageously embraces the inner part (1) in symmetrical and tight manner whereby the sheath part (2) is appropriately precompressed so that the forces essentially compensate each other in such a manner as to make the precompression sufficient to bear the full load of the prestress, and
    a shape-forming structure (4) arranged about the sheath part (2) with dimensions corresponding to the desired dimensions of the construction element, and the shape forming structure (4) is of a material with essentially lower compression strength than the material of the sheath part (2),
characterized in that
    the shape forming structure (4) comprises bead-like filler parts and a matrix structure surrounding the filler parts, the strength of the matrix structure is 2.5–3.5 fold that of the complete compression strength of the shape forming structure (4), and
    the ratio of the Young's modulus of the shape-forming structure (4) to that of the sheath part (2) is in the range of 0.15...0.30, thereby allowing the elastic shape forming structure (4) to bear
    tension and bending without cracking even after the precompression in the sheath part (2) caused by the pretensioned inner part (1) has been released by the tension and/or bending.

2. A construction element in accordance with claim 1, characterized in that the matrix material of the shape-forming structure (4) is reduced-weight concrete and polystyrene beads, with hydrophilic surface treatment function, as filler parts.

3. A construction element in accordance with claim 2, characterized in that the material of the shape-forming structure (4) is reduced-weight concrete with the following percentages of weight:
    Rapid cement: approx. 18 ... 28%
    Sand (0 ... 3 mm): approx. 60 ... 70%
    Microsilica: approx. 2 ... 3%
    Lignosulfonate: approx. 0.2 ... 0.6%
    Polystyrene: approx. 0.3 ... 0.9%
    Water: approx. 6 ... 10%.

4. A method for fabrication of a prestressed construction element of composite structure, in which method
    a pretensioned inner part (1) and a sheath part (2) are joined to make up a prestressed reinforcing structure (1,2), and
    a shape-forming structure (4) is cast around the prestressed reinforcing structure (1,2), characterized in that
    the shape-forming structure (4) is cast about the prestressed reinforcing structure (1,2) only after the sheath part (2) has experienced such an amount of permanent deformation, i.e., creep/relaxation, that the permanent deformation is essentially equal to the linear shrinkage caused by the hydraulic hardening reactions of the shape-forming structure (4).

* * * * *